Oct. 10, 1967 J. O. SCHAEFER 3,346,184

PNEUMATIC ACCUMULATOR

Filed April 21, 1966

2 Sheets-Sheet 1

INVENTOR.
JOHN O. SCHAEFER

BY E. Ronald Coffman

ATTORNEY.

United States Patent Office 3,346,184
Patented Oct. 10, 1967

3,346,184
PNEUMATIC ACCUMULATOR
John O. Schaefer, Lexington, Ky., assignor to International Business Machines Corporation, Armonk, N.Y., a corporation of New York
Filed Apr. 21, 1966, Ser. No. 544,197
11 Claims. (Cl. 235—201)

This invention provides a basic Add-Subtract arithmetic element that is particularly adapted to operate on pneumatically encoded data and is capable of producing arithmetic results in the form of pneumatically represented data.

An accumulator is a basic component of many arithmetic computing systems. The loop adder accumulator, which originated as a gear in a mechanical adding machine, finds mechanical, fluid, electrical, and electronic analogs in the current state of the art. The practicality of the specific mechanism for specific uses involves considerations of cost, speed, size, weight, and the nature of the available data source and data receiver. Accordingly, existing loop adder analogs cannot be expected to fill all needs.

It has been an object of this invention to provide a simple, reliable mechanical accumulator that is particularly adapted to operate with pneumatic input and output signals.

Another object of this invention has been to provide an accumulator that is capable of receiving input data in parallel coded form and converting the data to decimal form in addition to performing basic arithmetic functions thereon.

The construction and operation of an actuating and measuring mechanism employed in my invention, is disclosed and claimed in U.S. Patent No. 3,312,238 entitled, "Monostable Fluid Logic Element and Actuator," issued Apr. 4, 1967, in the name of W. F. Voit, Jr., Patent No. 3,312,238.

In accordance with one phase or concept of my invention, a flexible tape is transitorily stepped through selected measuring depressions by actuators operating in response to a numerical input. The length of tape measured by the selected depressions represents the input number in an analog form. The tape is restored from the depressions by a further actuator without disturbing its analog displacement, thus preparing the measuring depressions for further use. The analog representations of successive data entries are thus accumulated in the total displacement of the tape. The tape can also be stepped in the opposite direction through similar measuring depressions to subtract from the accumulated total. Output from the tape is conveniently obtained by employing the tape as a valve for controlling one or more pneumatic paths to provide readout of the instantaneous tape position. Visual output can also be provided by means of numbers printed on the tape.

In accordance with another phase or concept of my invention, the tape is formed in a closed loop to permit continuous unidirectional progression for repeated like functions, such as addition. The use of a closed loop of tape renders it unnecessary to reverse the tape direction when the output radix has been exceeded.

Preferred implementation of the closed loop concept is achieved through the following specific features: (1) when the tape is employed as a valve for readout purposes, or when, for other reasons, the tape is formed with holes therein, pneumatic actuation thereof, as described in the aforesaid Patent No. 3,312,238 is assisted by the provision of roller-like pistons that provide an effective seal for the actuators; (2) follow-up controlled "reset-to-zero" is provided to minimize the effect of cumulative error in the progressive stepping of the tape; (3) cumulative error is further minimized by the provision of positive tape detenting through detent pins and tape holes. Cumulative error is particularly important if the accumulator is used as a basic element of a multiplier or divider wherein a large number of repeated operations is required between zero resets.

The foregoing and other objects and concepts of my invention will appear and be better understood by those skilled in the art upon reading and understanding the following description of some specific preferred embodiments of my invention wherein reference is made to the accompanying drawings, of which:

Figures 1, 3, 4:
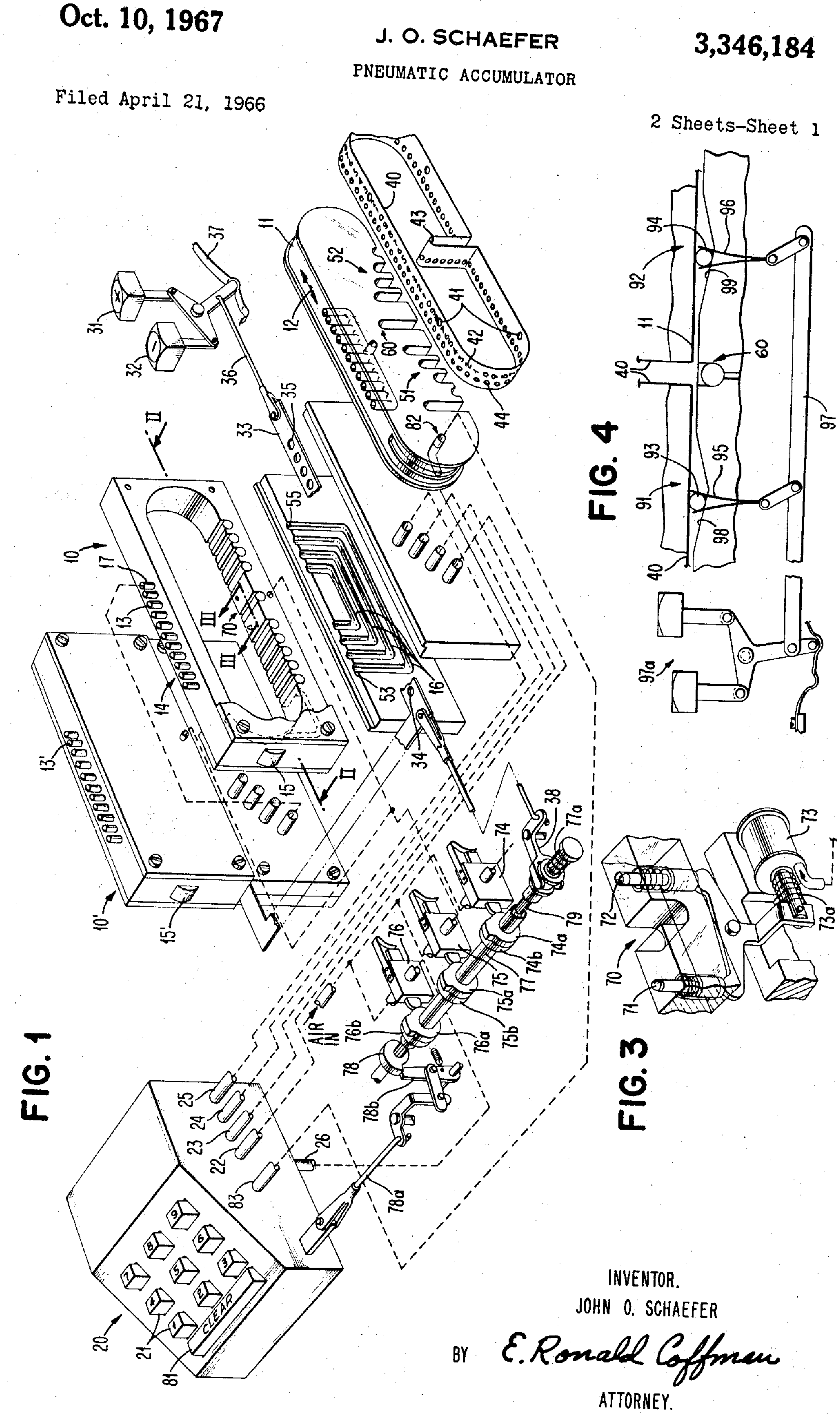
FIGURE 1 is an exploded perspective view of a preferred embodiment of my invention.
FIGURE 3 is an enlarged detail view of a portion of FIGURE 1 taken along line III—III thereof showing a first form of brake employed in my invention.
FIGURE 4 is an enlarged partial view of a different brake that can be employed in lieu of the brake illustrated in FIGURE 3 in accordance with a modified embodiment of my invention.

The preferred embodiment of my invention is shown in FIGURE 1 and includes an accumulator or loop adder 10 that is capable of performing arithmetic functions in response to entry of numerical data at keyboard 20 and selection of functions by function or sign keys 31 and 32.

Figure 2:
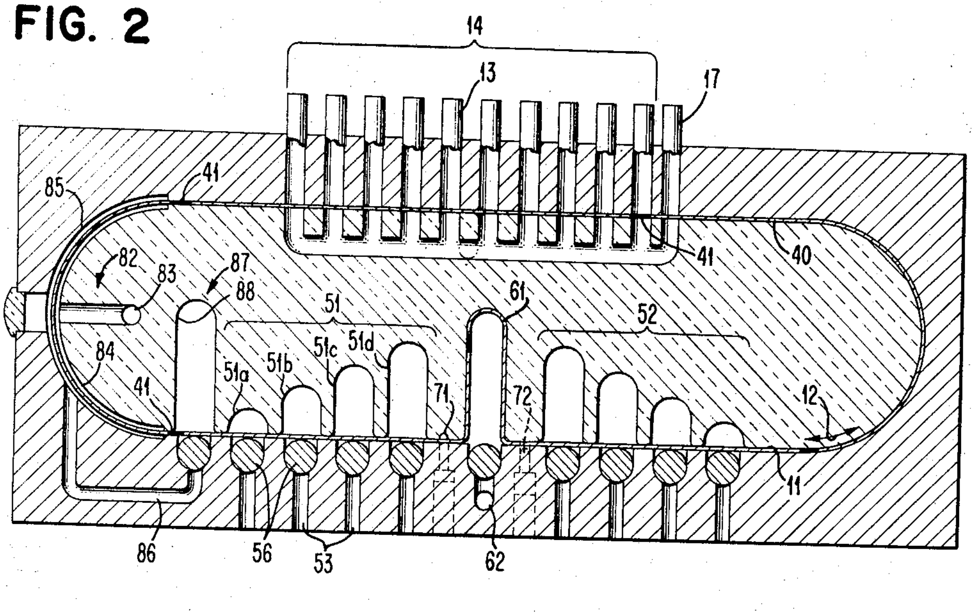
FIGURE 2 is an assembled vertical cross-sectional view of my accumulator taken along line II—II of FIGURE 1.

The accumulator 10 operates by collecting or accumulating analog values in the position of a strip of flexible tape 40 that preferably is formed into a closed loop (see FIGURES 1 and 2). The tape 40 is supported by a core or track 11 for movement along a continuous closed loop path 12. The tape 40 carries position indica, both in the form of holes or control openings 41, and printed numerals 42 for readout, reference, and other output purposes. The position indicia (both 41 and 42) are repeated along the length of the tape to avoid the necessity of reverse motion. The holes 41 are spaced a fixed distance one from the other such that one hole will at all times be in cooperation with a pneumatic output path or readout conduit 13 of a fluid readout station 14. Similarly, the numerals 42 will cooperate with a visual readout station or window 15 to display the number represented by the position of the tape 40.

Positioning of the tape 40 is accomplished partially in accordance with the method disclosed in the aforesaid U.S. Patent No. 3,312,238. The tape is initially displaced by either a positive number data entry actuator 51 or a negative number data entry actuator 52, depending upon whether addition or subtraction is desired. The actuator 51 comprises measured depression means formed in the track 11 along the path 12 on one side of the readout stations 14 and 15, and by supply conduits 53 which cooperate therewith to selectively create a pressure differential across the tape 40 to force it into the depression means. The depression means of the actuator 51 (see FIGURE 2), is formed conveniently of a plurality of depressions **51*a–d*. These depressions each have parallel sidewalls 54 and vary in depth or extent in accordance with a binary progression, such as 1, 2, 4 and 8 units corresponding to the unit distance between individual numerals 42 and between readout conduits 13. The actuator 52 is similar to actuator 51**.

Numerical input data is generated in the first instance at the keyboard 20 (see FIGURE 1), which can be constructed in accordance with the teachings of U.S. Patent 3,314,603 entitled "Fluid Encoder and Actuator," issued April 18, 1967 in the name of J. E. Jones and J. A. Machmer. Depression of a key 21 opens one or more fluid paths 22, 23, 24 and 25, representing the digital elements 1, 2, 4 and 8. The conduits 22 through 25 each supply one of four respective manifolds 16, each of which terminates in a positive number actuator supply conduit 53 and a negative number actuator supply conduit 55. Selection between actuator supply conduits 53 and 55 is accomplished by a slide valve 33 having control ports 34 and 35 therein. Valve 33 is located in one of two operative positions by the function keys 31 and 32 connected thereto through a link 36. The position of keys 31 and 32 is maintained by a detent spring 37.

Normally, the tape 40 is in a position wherein a loop 43 of excess tape is retained in a depression 61 of a restore actuator 60 (see especially FIGURE 2). Depression 61 is similar in shape to depressions 51*a–d*, and is of an extent at least equal to the largest number of tape displacement units (usually 10) to be entered. The actuator 60 further includes a restore supply conduit 62 that is selectively operable to create a pressure differential across the tape 40 and force it into the depression 61.

Lightweight rollers or piston members 56 in each of the actuators 51, 52 and 60 cooperate with the parallel sidewalls thereof to allow full development of an actuating pressure differential therein, regardless of the position of holes 41 in the tape 40.

The direction of tape movement upon operation of actuators 51, 52 and 60 is controlled by an air operated braking mechanism 70 (see FIGURE 3). The braking mechanism comprises a first brake detent pin 71 that is normally in an active position wherein it pierces a detent opening or hole 44 (see FIGURE 1) in the tape 40 to both locate the tape accurately at an incremental position and to anchor the tape between the actuators 51 and 60 thereby providing a directional reference relative to the stations 14 and 15. The braking mechanism 70 also includes a normally inactive detent pin 72 that is cooperable when active with the holes 44 in the tape 40 to anchor the tape between the actuators 52 and 60 and provide a directional reference relative to the stations 14 and 15. An air cylinder 73 is operable under the control of a cyclically opened sequence valve 74 to deactivate the pin 71 and activate the pin 72, and vice versa, at proper cycle times. Further cyclically operable sequence valves 75 and 76 are provided to respectively control air supplied to the restore actuator 60 and to the data entry actuators 51 and 52 via keyboard 20.

The sequence valves 74, 75 and 76 are driven from a time base, such as a synchronous motor (not shown), through a timing shaft 77 upon engagement of a one revolution clutch 78. The shaft 77 is slidably mounted on a splined shaft 79. In an Add mode shaft 77 is axially positioned such that cams 74*a*, 75*a* and 76*a* are operatively associated with, respectively, the sequence valves 74, 75 and 76. In a Subtract or negative number mode, the timing shaft 77 is moved by lever arm 38 axially along the splined support shaft 79 against a spring 77*a* to place sequence cams 74*b*, 75*b* and 76*b* in operative cooperation with valves 74, 75 and 76. A pull link 78*a* is operated upon depression of any of the keybuttons 21 of the keyboard 20, and causes engagement of the one revolution clutch 78 by picking a clutch latch 78*b*. The particular sequence of valve controlled operations is programmed by the contours of the cams 74*a*, 75*a* and 76*a*, or 74*b*, 75*b* and 76*b*, depending upon the mode selected by function keys 31 and 32.

Operation of the apparatus thus far described for a simple addition or subtraction is as follows: the first number to be operated on can be either positive or negative. Assuming that the first number is positive, it is entered by depressing one key of the keyboard 20. For example, the number "3." Immediately the link 78*a* picks clutch latch 78*b* to begin rotation of timing shaft 77. Cam 76*a* promptly opens valve 76 to supply fluid to an encoding supply manifold or keyboard inlet 26 and thereby pressurize the "one" conduit 22 and the "two" conduit 23 through the coding mechanism of the aforesaid Patent No. 3,314,603. Since the number is positive, slide valve 33 permits the thus supplied fluid to pass through the respective "Add" actuator entry conduits 53 and thereby force three units of the tape 40 out of the restore cavity 61 into the depressions 51*a* and 51*b*. As the brake pin 71 is normally active, the tape 40 moves past the readout stations 14 and 15 (rather than directly from the cavity 61 to the actuator 51), thus presenting the number "3" at window 15 and also presenting one of the output holes 41 in alignment with the number "3" readout conduit 13. Immediately following this initial movement of the tape 40, valve 76 is closed. Valve 74 is then opened to shift the brake pin 71 to its inactive position and the brake pin 72 to its active position in preparation for restoration of the metered tape. While the brake pin 72 is maintained active, valve 75 is opened to deliver a restore pulse to the restore actuator 60, thus pulling the measured tape out of depressions 51*a* and 51*b* in preparation for receipt of additional data. The brake pin 72 prevents the motion of tape 40 past the operating stations 14 and 15 during the restore operation.

A second numeral can now be inserted by depression of another key of the keyboard 20. As before, the number can be either positive or negative. Assuming number "2" is selected and is positive, the mechanism will cycle in sequence as before with the "2" conduit 23 being pressurized to depress two units of tape into the depression 51*b*, thus progressing the tape two units more counterclockwise and presenting the sum "5" at the window 15, and the hole 41 in alignment with the number "5" readout conduit 13. The remaining sequence restores the tape 40 in preparation for receipt of additional data.

Assuming that it is desired now to subtract the number "1" from the sum thus derived, the number "negative 1" is inserted, first by depression of the minus key 32 which shifts the slide valve 33 and the sequence shaft 77 to their subtract positions. The "1" key is then depressed tripping the link 78*a* and commencing rotation of the timing shaft 77. The valve 74 is the first to open and it shifts the brake pin 71 to its inactive position and the brake pin 72 to its active position. Immediately following this shift, the valve 76 opens to pressurize the "one" conduit 22 as selected by the input key. The slide valve 33, in its new position, directs the input pulse in conduit 22 to the "one" unit depression of the subtract entry actuator 52 to move one unit of tape thereinto. Since the brake pin 72 is in its active position, the tape 40 will be forced to move clockwise one unit past the operating stations 14 and 15 to thus present the control opening 41 in alignment with the number "4" output conduit 13 and the character "4" to the window 15. Immediately following the tape movement, pressure is withdrawn by closure of valve 76. Valve 74 is also closed allowing the air cylinder 73 to restore to its normal position under the influence of its spring 73*a* and thereby returning the brake pin 71 to its active position and brake pin 72 to its inactive position. A pulse follows from the restore valve 75 to return the tape 40 to its restored position in preparation for receipt of a further input.

It will be seen that the foregoing basic arithmetic functions typify the basic requirements for mechanical numerical handling. Two other functions are ordinarily required for practical arithmetical operation.

*Carry and borrow*

First, it is desirable to employ separate stages for each ordinal or digital stage in a decimal system. It is thus necessary to provide a carry or borrow interface between ordinal stages. A carry or radix sensing conduit 17 is provided in each accumulator stage and is spaced from the output conduits 13 a fractional unit such that a hole 41 will never come to rest in alignment therewith, but will always pass thereover upon the transition between the numbers "9" and "0" as the radix of the decimal system is exceeded. Conduit 17 is connected with the "1" manifold of the next higher stage and operates to add a positive or negative "1" thereto, depending upon the sign of the number currently being processed. For example, if it be assumed that the accumulator 10 contains an "8" such that a hole 41 is positioned in alignment with the "8" readout conduit 13 and the number "8" is appearing at readout window 15, and it is desired to add "3" thereto, it is apparent that the capacity of the single stage of the accumulator will be exceeded. A second or next higher order accumulator 10' is shown connected to the first accumulator 10 by the carry conduit 17. As the first accumulator is processing the number "3," a hole 41 in its tape 40 will pass the conduit 17 causing the second accumulator to process the number "1" or more accurately, the number "10," within substantially the same cycle time. The second accumulator will come to rest with the number "1" shown in its output window 15' and a readout hole (not shown) in alignment with the number "1" output conduit 13'. The two ordinal stages will now read the number "11," each showing a number "1" in its respective window.

If it is now desired to subtract the number "2" from the previous sum "11," the minus key is depressed, thus setting all ordinal stages to a receive negative number. The number "2" key is then depressed to institute a normal subtract operation wherein the tape 40 of accumulator 10 progresses clockwise two units. It will be apparent that the capacity of the first ordinal stage will again be exceeded since the hole 41, originating under the number "1" conduit 13, will pass beyond the "0" conduit. As this passage occurs, that hole 41 passes the carry conduit 17, thus transferring a negative "1" to the next higher ordinal stage which is processed in the same cycle time as the number "2" is processed in the first ordinal stage. The tape in the second ordinal stage is thus moved one unit clockwise to present a "0" at its readout window 15'. The low order ordinal stage progresses clockwise the full two units and presents the number "9" at the window 15 and a hole 41 in alignment with the number "9" readout conduit 13.

*Clear*

The other function required for practical operation is the ability for the accumulator to be easily cleared to zero. I have provided a clear mechanism that principally performs an addition cycle that is automatically terminated when the stage has been reset to zero. The clear mechanism involves a clear control key 81, that operates a reset control means 82 (see especially FIGURE 2). The function key 31 should be depressed to place the Add sequence cams 74*a*, 75*a* and 76*a* in their operative position. The clear key 81 operates the cycle link 78*a* to initiate operation of the timing cam shaft 77 and valves the air supply 26 to pressurize a conduit 83 that leads to a part-annular manifold 84. The cycle continues just as in an ordinary Add sequence. Manifold 84 supplies fluid pressure to the tape 40 throughout a length equal to the spacing between adjacent output holes 41. A complementary manifold 85 is formed on the opposed side of the tape 40 and is connected through a branch conduit 86 to a reset actuator 87 having a depression 88 constructed similar to those of the other actuators 51, 52 and 60. A complete pneumatic circuit is thus provided by the clear key 81 to the "clear" actuator 87 so long as one hole 41 is within the range defined by the manifolds 84 and 85. It will be seen from the geometry thus described that one hole 41 will always be within this range at all times, when no hole 41 is positioned at the zero output conduit.

The OPERATION of the clear mechanism is as follows: let it be assumed that the number "6" is contained in the accumulator, i.e., the hole 41 in tape 40 is aligned with the number "6" readout conduit 13 and the number "6" appears on the window 15. If it is desired to clear the accumulator, the add key 31 is depressed to place the accumulator in the Add mode, then the clear key 81 is depressed. Cycle link 78*a* initiates operation of the timing shaft 77, thus first transmitting fluid pressure to the keyboard 20 and out through conduit 83. Since the tape 40 was in the number "6" position, a hole 41 will be within the range of the manifolds 84 and 85, and fluid pressure thus will be supplied to the clear actuator 87 causing a counterclockwise tape motion as in an ADD cycle. This tape motion will continue until the hole 41 has moved out of the range of the manifolds 84 and 85, whereupon tape movement will immediately stop. Since the manifolds 84 and 85 are dimensioned to be of slightly less length than the spacing between the holes 41, one hole 41 will leave the manifold immediately prior to the entrance of the next adjacent hole thereinto. In the position where the tape has stopped, one hole 41 will be located on the "0" readout conduit 13 and the number "0" will appear at the window 15. The carry which occurred as a result of this cycle can be inhibited if desired, or can be permitted to occur requiring clearing of all higher order ordinal stages in sequence. Continuing the cycle, after termination of the tape movement, the brake pins 71 and 72 are shifted under control of valve 75, and valve 74 pulses the restore actuator 60 to remove the tape from actuator 87 and thus prepares the device for receipt of additional numbers.

In FIGURE 4 there is shown a modification of the braking means shown in FIGURE 1. In FIGURE 4 a pair of directional friction brakes 91 and 92 are provided to eliminate the sequencing required of the detent pins 71 and 72. The directional brakes employ rollers 93 and 94 which are each biased by respective leaf spring yokes 95 and 96, either to the right or to the left as controlled by ADD-Subtract linkage 97. The rollers 93 and 94 ride in camming depressions 98 and 99 in well-known manner, such that movement of the tape 40 in the direction of the spring bias will cause the rollers 93 and 94 to ride upon the cam surface and wedge grip the tape 40 against the track or opposed wall 11. Tape motion in the direction opposed to the spring bias, however, will not be inhibited by the rollers 93 and 94 due to the direction of the cooperating cam shape. A plus-minus or function key 97*a* of this modification controls the slide valve 33 (FIGURE 1) as described above, but instead of shifting a set of sequence cams, it merely reverses the spring bias of leaf spring yokes 95 and 96. It will be seen that an Add operation requires a simple control that permits motion only in the counterclockwise direction, and that a subtract operation requires motion that is in the clockwise direction. Particularly, external sequencing of the brakes is not required in this embodiment.

Those skilled in the art will appreciate that I have provided a basic element for conveniently performing arithmetic functions that is particularly adaptable to operation upon pneumatically encoded data. It will also be appreciated that the basic functions performed by the preferred embodiment herein described are merely illustrative of the principles and that these principles can be applied to more sophisticated combinations for the purpose of multiple ordinal data entry, more convenient keyboarding, multiplication, operation from a remote data source, etc., without departing from the concepts of the invention herein disclosed.

Having thus described my invention, its concepts, and some preferred embodiments thereof, I claim:

1. An accumulator comprising:
a strip of flexible tape having position indicia thereon,
means supporting said strip for movement along a path,
a readout station located adjacent said path for cooperative alignment with said position indicia,
first actuating means positioned on one side of said readout station and comprising first depression means of predetermined extent formed in said path, and first selectively operable means for forcing said strip into said first depression means,
second actuating means positioned beyond said first actuating means along said path and comprising second depression means in said path of an extent at least equal to said first depression means and second selectively operable means for forcing said strip into said second depression means, first brake means for preventing strip movement between said first and second depression means during operation of said first selectively operable means, and second brake means for preventing strip movement between said readout station and said first depression means during operation of said second selectively operable means.

2. An accumulator as defined in claim 1 wherein said first and second brake means each comprise a directional friction brake for frictionally preventing movement of said strip in the direction from said second depression means toward said first depression means and said readout station.

3. An accumulator as defined in claim 1 wherein said first and second brake means each comprise a detent pin that is operable to positively engage said strip during operation of said respective selectively operable means.

4. An accumulator as defined in claim 1 wherein said first depression means is comprised of a plurality of separate depressions and said predetermined extent is divided between said plurality of depressions in accordance with a binary progression.

5. A pair of accumulators as defined in claim 2 each operable on a number system having a radix defined by predetermined movement of the strip thereof and further comprising; means responsive to each accumulation of said predetermined movement by the strip of one of said accumulators for operating a depression of said first actuating means of the other of said accumulators to displace the strip thereof an amount representative of the radix of said one accumulator.

6. An accumulator comprising:

a closed loop strip of flexible tape having position indicia thereon, means supporting said strip along its length for movement along a continuous path, said path having a readout station therealong cooperatively alignable with said position indicia, first actuating means positioned on one side of said readout station and comprising first depression means of predetermined extent in said path and first selectively operable means for forcing said strip into said first depression means, second actuating means positioned beyond said first actuating means along said path and comprising second depression means in said path of an extent at least equal to the extent of said first depression means and second selectively operable means for forcing said strip into said second depression means, first brake means for preventing strip movement between said first and second depressions during operation of said first selectively operable means, and second brake means for preventing strip movement between said readout station and said first depression during operation of said second selectively operable means.

7. An accumulator as defined in claim 6 further including additional actuating means positioned on the other side of said readout station and comprising additional depression means of predetermined extent formed in said path and additional selectively operable means for forcing said strip into said additional depression means, and function control means for selecting alternate operation of said first actuating means and said additional actuating means and for varying the sequential operational relationship between said first brake means, said second brake means, said second actuating means and said selected one of said first and additional actuating means.

8. An accumulator as defined in claim 6 wherein said position indicia comprises a plurality of spaced holes formed in said strip at predetermined spaced locations and further including:

third actuating means comprising third depression means in said path of an extent at least equal to the extent of said first depression, third selectively operable means for forcing said strip into said third depression means, and control means for terminating operation of said third selectively operable means in response to the positioning of said position indicia holes at predetermined positions along said path.

9. An accumulator as defined in claim 6 wherein said first and second actuating means are operated pneumatically.

10. An accumulator as defined in claim 6 wherein said position indicia comprises a plurality of holes formed in said strip at predetermined spaced locations therealong and said readout station comprises at least one pneumatic path controlled by the position of said position indicia holes.

11. An accumulator as defined in claim 6 wherein said first and second actuating means further include piston members cooperable with their respective depressions to provide effectively fluid tight chambers, and further comprising pneumatic input means for control of said selectively operable means.

References Cited

UNITED STATES PATENTS 3,263,922 8/1966 Voit ---------------- 235—201

RICHARD B. WILKINSON, *Primary Examiner.*

LAWRENCE R. FRANKLIN, *Assistant Examiner.*